April 3, 1951  E. O. OHLSSON  2,547,594
DEVICE FOR CONVERTING ROTARY MOTION
INTO RECIPROCATING MOTION
Filed May 9, 1949
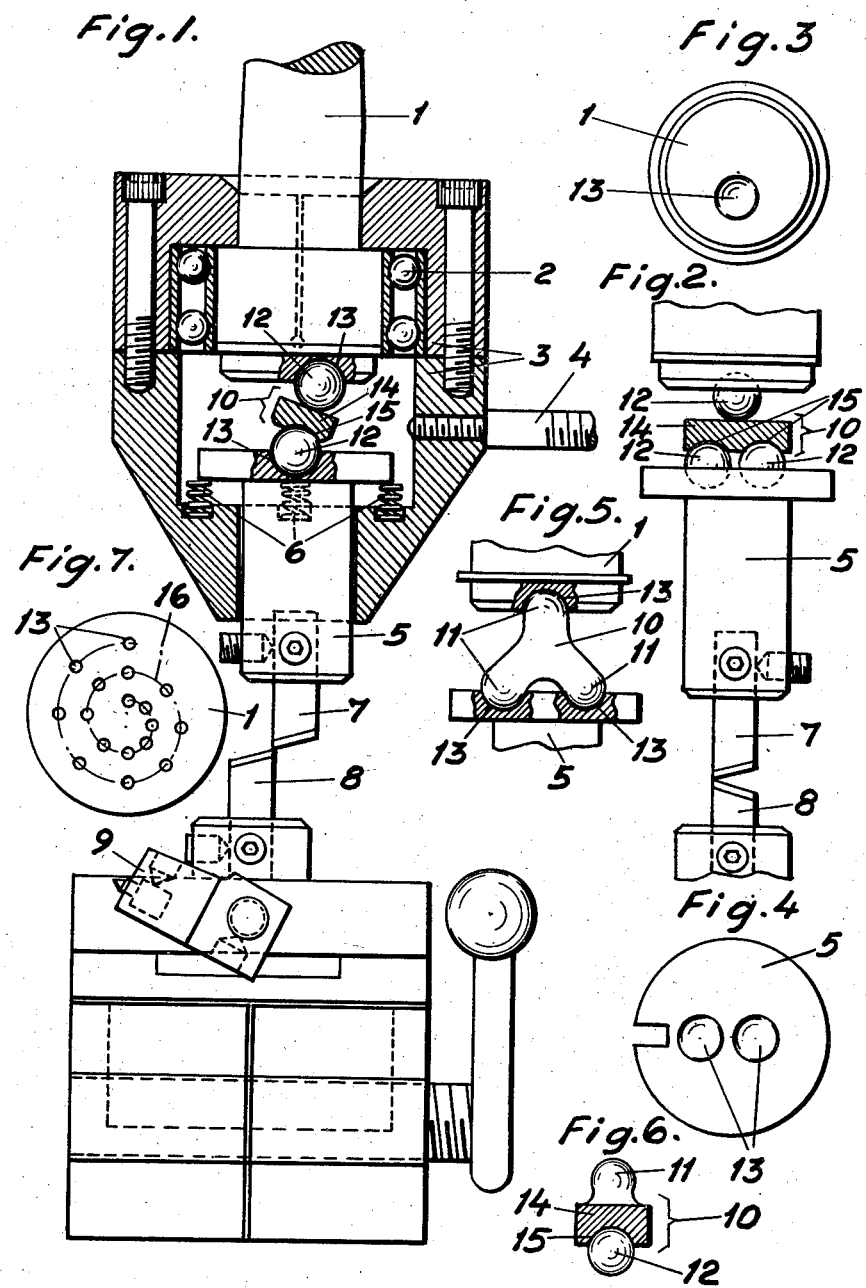
Inventor
Eric Oscar Ohlsson Patented Apr. 3, 1951

2,547,594

UNITED STATES PATENT OFFICE 2,547,594

DEVICE FOR CONVERTING ROTARY MOTION INTO RECIPROCATING MOTION

Eric Oscar Ohlsson, Hagalund, Sweden

Application May 9, 1949, Serial No. 92,166
In Sweden December 1, 1948

3 Claims. (Cl. 74—50)

Particularly within the machine industry the problem often arises that a rotary motion is to be converted into a reciprocating motion, and this without too extensive arrangements. Generally, this does not cause any great trouble, if the reciprocating motion may have a direction which is perpendicular to the axis of the rotary motion, but when the reciprocating motion shall have a direction paralleling that of the axis of rotation, it at once becomes more difficult to solve the problem in a simple and space-saving manner.

The present invention now relates to a device for converting rotary motion into reciprocating motion parallel and preferably co-axial to the axis of the rotary motion, and the device is primarily meant to be used for converting the rotary motion of the boring spindle of a drill press into a striking motion of a plate shearing edge, a hole punching apparatus or a hammer, so that especially a frame drill press may be utilized for other purposes than boring only. The device comprises a rotatable body which, by way of example, may be connected with the chuck of the drill press, and an axially displaceable, non-rotatable plunger placed in the extension of the rotatable body and pressed in the direction towards the rotatable body by means of spring members, and the device is chiefly characterized by the fact that a member is disposed between the rotatable body and the plunger, said member resting permanently with a support portion against a fixed point on the rotatable body and with another support portion against a fixed point on the plunger, both the said points being disposed eccentrically relatively the axis of rotation of the body or relatively the extension of said axis.

The device now will be described more in detail, reference being had to the accompanying drawing, and from this description further properties characterizing the invention will appear. In the drawing, Fig. 1 shows a device according to the invention utilized in a drill press for providing a shearing effect between two cutting edges. Fig. 2 shows the device illustrated in Fig. 1 viewed from the side, and Figs. 3 and 4 show the rotatable body viewed from beneath and the plunger viewed from above respectively in Fig. 2. Figs. 5 and 6 show variations of the member placed between the rotatable body and the plunger, and Fig. 7 finally shows an end view of the rotatable body, in which different lengths of stroke of the plunger may be obtained.

In Fig. 1 the rotatable body 1, which for instance may be connected with the boring spindle of a drill press, is rotatably journalled in the upper part of a separable casing 3 by means of ball bearings, which casing through an arm 4 may be held stationary at the machine in question. In the lower part of the casing 3 a plunger 5 is provided, which is non-rotatable relatively the casing 3 and is pressed upwardly towards the rotatable body by spring members 6. At its lower end the plunger 5 may carry a movable edge 7, which during plate shearing operations co-operates with a stationary edge 8 placed at a support block or the like resting on the basis plate of the drill press, which may be equipped with settable means such as centre support 9 in order to permit rondel shearing.

Between the rotatable body 1 and the plunger 5 is placed a member 10 which, as appears from Figs. 1, 2 and 6, may comprise several parts but always rests with one supporting portion against a point on the lower surface of the rotatable body and with at least one more supporting portion against a point on the upper surface of the plunger, and the support point on the body 1 as well as on the plunger 5 is placed eccentrically relatively the axis of rotation of the body 1 or the extension of said axis through the plunger. The member 10 may rest with one or more support portions against the plunger 5 and the number of support portions also indicates the number of strokes which the plunger 5 will perform at each revolution of the body 1. In the cases shown in the drawing (Figs. 1, 2 and 5) the plunger thus will perform two strokes for each revolution of the body 1.

The member 10 is preferably provided with spherical support surfaces 11, which advantageously, as shown in Figs. 1, 2 and 6, are constituted by steel balls 12 journalled in spherical hollows 13 in the body 1 and the plunger 5 respectively. In Figs. 1 and 2 the member 10 thus consists of two balls 12 resting against the plunger 5 and a bridge 14 carried by these balls, in which bridge the balls resting against the plunger are countersunk into spherical hollows 15, as well as a ball 12 mounted in the body 1 and freely movable on the upper surface of the bridge 14. In Fig. 6 the upper ball in Fig. 1 is replaced by a spherical part 11 which is rigidly connected with the bridge 14, and in Fig. 5 the member forms a single rigid unit.

Fig. 7 shows an embodiment of the lower side of the rotatable body 1, and therein this has been provided with a number of recesses 13 arranged along a spiral 16, in which recesses the upper spherical support part 11 or the upper ball 12 may be placed arbitrarily, so that its eccentricity relatively the axis of rotation of the body 1 may be changed and thus different lengths of stroke of the plunger 5 may be attained.

The device according to the invention operates substantially in accordance with that principle that the straight distance between two points arranged eccentrically relatively an axis of rotation varies continuously when the one point rotates about said axis. This also makes it evident that the invention is in no way confined to the embodiments shown in the drawing.

Having now described my invention, what I claim as new and desire to secure by Letters Patent is:

1. A cutting and stamping accessory for drilling machines comprising in combination a housing, a rotatable shaft entering the top of said housing and adapted to be connected to the spindle of the drilling machine, a non-rotatable and axially reciprocatable plunger located axially of said shaft in said housing and protruding through the bottom thereof, means for retaining said housing stationary in relation to the drilling machine, springy means for keeping said plunger towards the end of said shaft in said housing, and means between said shaft end and said plunger for converting the rotary motion of said shaft to a reciprocating motion of said plunger, said last mentioned means comprising one spherical portion resting against said shaft end and excentrically thereto and two spaced spherical portions resting against said plunger excentrically in relation to an extension of the axis of said shaft.

2. A cutting and stamping accessory for drilling machines comprising in combination a housing, a rotatable shaft entering the top of said housing and adapted to be connected to the spindle of the drilling machine, a non-rotatable and axially reciprocatable plunger located axially of said shaft in said housing and protruding through the bottom thereof, means for retaining said housing stationary in relation to the drilling machine, springy means for keeping said plunger towards the end of said shaft in said housing, and means between said shaft end and said plunger for converting the rotary motion of said shaft to a reciprocating motion of said plunger, said last mentioned means comprising two steel balls resting in spherical recesses in the top of said plunger excentrically in relation to an extension of the axis of said shaft and diametrically thereto and intermediate means between said balls and said shaft end, said intermediate means comprising a spherical portion resting against said shaft end excentrically thereto.

3. A cutting and stamping accessory for drilling machines comprising in combination a housing, a rotatable shaft entering the top of said housing and adapted to be connected to the spindle of the drilling machine, a non-rotatable and axially reciprocatable plunger located axially of said shaft in said housing and protruding through the bottom thereof, means for retaining said housing stationary in relation to the drilling machine, springy means for keeping said plunger towards the end of said shaft in said housing, and means between said shaft end and said plunger for converting the rotary motion of said shaft to a reciprocating motion of said plunger, said last mentioned means comprising two steel balls resting in spherical recesses in the top of said plunger excentrically in relation to an extension of the axis of said shaft and diametrically thereto and intermediate means between said balls and said shaft end, said intermediate means comprising a steel ball resting in a spherical recess in said shaft end excentrically to the axis of said shaft, and a plate member between said first mentioned balls and said last mentioned ball, said member having spherical recesses on its lower side to receive said first mentioned balls and a smooth upper side permitting relative movements of said last mentioned ball.

ERIC OSCAR OHLSSON.

REFERENCES CITED

The following references are of record in the file of this patent:

UNITED STATES PATENTS

| Number | Name | Date |
| --- | --- | --- |
| 1,457,427 | Castle | June 5, 1923 |
| 2,365,067 | Gauld | Dec. 12, 1944 |
| 2,436,492 | Shepard | Feb. 24, 1948 |